(No Model.)
J. J. HOGAN.
PLUMBER'S SAFE CONNECTION.
No. 473,460. Patented Apr. 26, 1892.
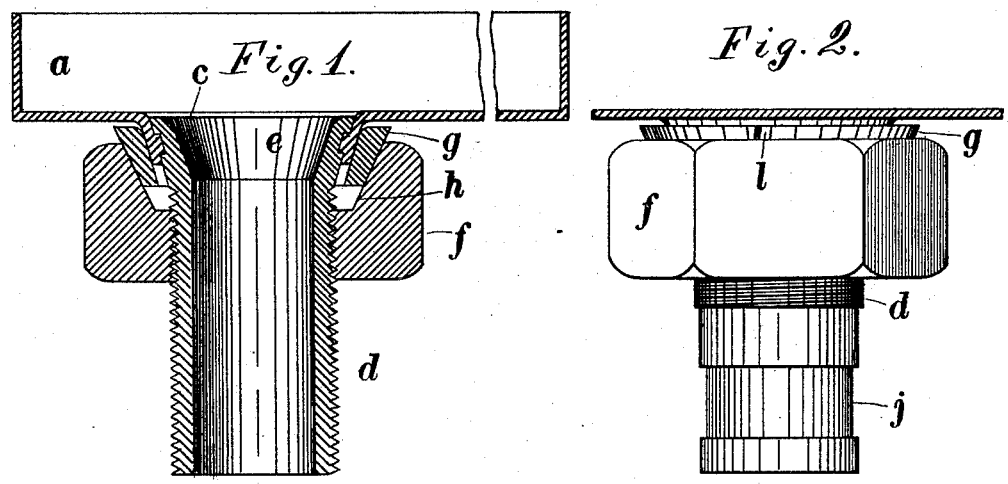
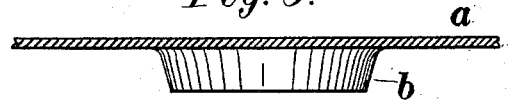
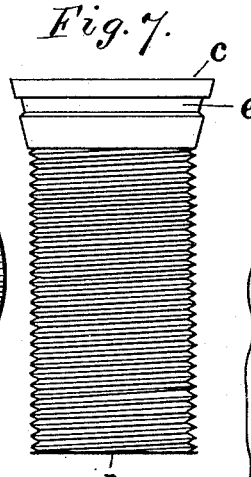
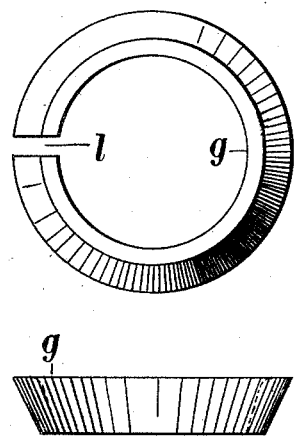
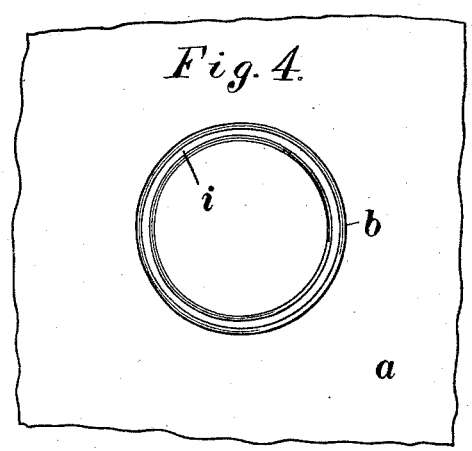
Attest:
L. Lee.
J. Van Nest Jr.
Inventor.
John J. Hogan, jr.
Crane & Miller, Attys.
THE NORRIS PETERS CO., PHOTO-LITHO., WASHINGTON, D. C.

UNITED STATES PATENT OFFICE.

JOHN J. HOGAN, OF BROOKLYN, ASSIGNOR TO THE HOGAN ENGINEERING COMPANY, OF NEW YORK, N. Y.

PLUMBER'S SAFE CONNECTION.

SPECIFICATION forming part of Letters Patent No. 473,460, dated April 26, 1892.

Application filed June 15, 1891. Serial No. 396,356. (No model.)

*To all whom it may concern:*

Be it known that I, JOHN J. HOGAN, a citizen of the United States, residing at Brooklyn, Kings county, New York, have invented certain new and useful Improvements in Plumbers' Safe Connections, fully described and represented in the following specification and the accompanying drawings, forming a part of the same.

The object of this invention is to facilitate the connection of an outlet-nozzle with tanks and "safe-pans" made of lead. In the present construction the joint is formed between the outlet-nozzle and the lead sheet by bending or flanging a collar upon the under side of the sheet to fit over a tapered head upon the outlet-nozzle and screwing a nut upon the nozzle with a conical seat to clamp the nut to the flared head. A groove is formed in the flared head to lock the lead collar thereto and prevent its pulling out.

The invention will be understood by reference to the annexed drawings, in which—

Figure 1 is a section through the bottom of a safe-pan and my improved connection, with nozzle threaded at the end for connection with screwed pipes. The "pan" is shown broken in respect to length for want of room upon the drawings. Fig. 2 is an external view of the "safe connection" with a section of the lead sheet to which it is attached, the nozzle having grooved end for a coupling-collar. Fig. 3 is an edge view of the lead sheet where the conical collar is formed thereon. Fig. 4 is a top view of the sheet adjacent to the collar with the tongue shown in the collar as it is formed in contact with the head of the nozzle. Fig. 5 is an end view, and Fig. 6 an edge view, of a removable conical seat; and Fig. 7 is an external view of the threaded nozzle shown in Fig. 1.

$a$ represents the bottom of a safe-pan, tank, or other construction or receptacle for holding fluid; $b$ is the tapering collar flanged or bent downward thereon; $c$, the head of the nozzle $d$, flared externally and provided with groove $e$.

$f$ is a nut fitted to thread upon the nozzle $d$ and shown in the drawings with a conical split collar $g$, fitted (upon its inner side) to the exterior of the tapering collar $b$ and upon its outer side to a conical socket $h$, formed in the nut $f$. The collar $g$ forms a removable seat in the nut $f$ and is provided with a cut or aperture $l$ at one side for a purpose hereinafter described. The collar $b$ is formed of suitable size to receive snugly the head $c$ upon the nozzle, and the screwing of the nut $f$ upon the nozzle operates to force the tapering seat $g$ against the interior of the collar $b$ and to crush the lead collar into the groove $e$ upon the head. A tongue $i$ is thus formed upon the interior of the collar, which is thereby locked to the head $c$, so that it cannot be accidentally displaced. The aperture $l$ in the side of the ring-shaped seat $g$ adapts the collar to clamp the lead in two different ways, as it permits the contraction of the collar when its upper edge experiences any resistance, and thus allows the continued operation of the nut $f$ and an increased pressure upon the collar $b$ without tearing the lead, which might result if the collar $g$ were pressed forward. The nut $f$ may be formed with an integral seat to press upon the collar $b$, but in such case would rotate with the nut and be liable to tear the lead. By the use of a removable seat like the split collar $g$ the collar may adhere to the lead while the nut is rotated, and by forming the aperture $l$ in the side of the removable seat it is adapted to clamp the lead, first, by longitudinal movement, and, second, by contraction when such longitudinal movement is arrested. The seat $g$ being formed with tapering bore and pressed upon the lead by the screw-thread in the nut $f$, exerts a very powerful clamping-pressure, and thus forms a very perfect and rigid joint between the lead collar and the head of the nozzle. The lower end of the nozzle may be connected with other pipes and fittings by screw-thread formed upon its exterior or by means of a groove $j$, (shown in Fig. 2,) which adapts the nozzle to receive a coupling-collar for connection with other pipes and fittings, as claimed in my patent, No. 459,907, dated September 22, 1891.

Having thus set forth the nature of my invention, what I claim is—

1. The combination, with the threaded nozzle $d$, having flared head $c$, provided with groove $e$, of the lead collar $b$, bent from the bottom of the receptacle *a*, and the nut *f*, fitted to the nozzle and formed with conical seat *h*, adapted to clamp the collar upon the flared head, substantially as herein set forth.

2. The combination, with the threaded nozzle *d*, having flared head *c*, provided with groove *e*, of the lead collar *b*, bent from the bottom of the safe *a*, the nut *f*, fitted to the sleeve and provided with the removable conical seat *g*, split at one side, as and for the purpose set forth.

JOHN J. HOGAN.

In presence of—
L. C. DAWES,
T. S. CRANE.